C. J. SILL.
RODENT EXTERMINATOR.
APPLICATION FILED JUNE 24, 1913.

1,113,842.

Patented Oct. 13, 1914.

Witnesses,

Inventor,
Clyde J. Sill,
Attorneys

UNITED STATES PATENT OFFICE.

CLYDE J. SILL, OF PERRIS, CALIFORNIA.

RODENT-EXTERMINATOR.

1,113,842.  Specification of Letters Patent.  Patented Oct. 13, 1914.

Application filed June 24, 1913. Serial No. 775,500.

*To all whom it may concern:*

Be it known that I, CLYDE J. SILL, a citizen of the United States, residing at Perris, in the county of Riverside and State of California, have invented new and useful Improvements in Rodent-Exterminators, of which the following is a specification.

This invention relates to rodent exterminators, and the principal object is to provide an exterminator in which poisoned material is automatically deposited in a feeding pan.

It is also an object to provide a reservoir that may be readily removed from a permanent base and refilled when emptied.

It is a further object to provide a rodent exterminator with a grain feeding device in which the grain may be sealed to prevent tampering, together with the provisions in the base for securing the cover when the container is inverted over the pan.

Figure 1:
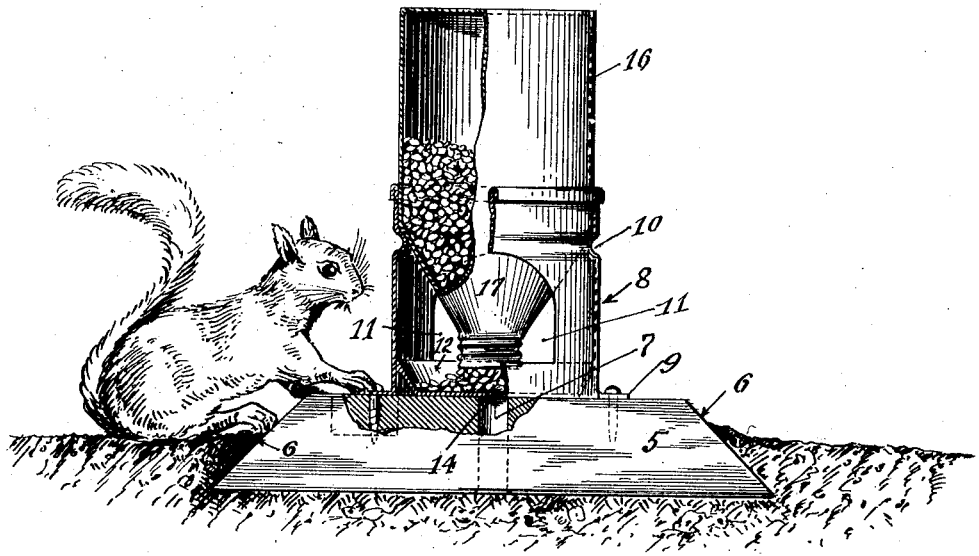
Figure 2:
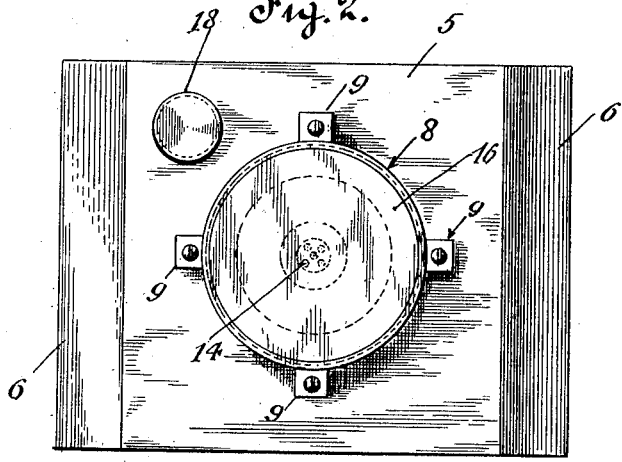

In the drawings accompanying this specification and forming therewith the application for Letters Patent: Figure 1 is an elevation partly in section, showing the application of the invention. Fig. 2 is a plan view of the device showing the base removed from the ground.

More specifically in the drawings, 5 designates the base plate preferably of wood having the inclined faces 6 which are adapted to be inserted part way in the ground or a distance equal to about one-half of the thickness of the base block 5 through which is bored a centrally disposed opening 7. Secured upon this block is a container holder 8 consisting of a cylindrical shell of metal, having base flanges or ears 9 and an annular supporting serration 10 adjacent its top. This shell is cut out intermediate of the serration and the base to form openings 11 through which the rodents obtain access to the pan 12, which rests upon the block 5 and is preferably of the shallow dished form shown. This pan is provided with a plurality of small drain openings 14 which are adapted to register over the bore 7 to allow rainwater to escape.

Inverted within the shell is a container 16 preferably of the cylindrical form shown, with a conical top portion 17 which is truncated to provide an opening for the exit of poisoned material adapted to be contained therein. The opening into this container is preferably threaded and provided with a cap 18 which is secured, when the device is in operation, in a bore sunk from the upper surface of the block 5, as clearly shown in Fig. 2.

It has been found in exterminating rodents, especially ground squirrels and gophers, where the grain impregnated with some poison is scattered, that the weather causes deterioration and loss of its efficiency, and that other animals than those to be destroyed have access to the grain, and this invention overcomes the above difficulties in providing a container in which the grain is automatically fed through the opening in the conical portion 17 acting as a hopper when inverted within the apertured shell, the opening 11 being so arranged that it is difficult for other than the desired animals to obtain access to the grain in the pan 12, and that no grain is wasted or lost or covered by movements of the soil in proximity thereto, and when one can is emptied another which has been filled at the filling station is readily introduced after the removal of the cover, and the grain is not left exposed to the weather.

What I claim is:

1. A rodent exterminator, comprising a base, having a bore therethrough and tapered edges, a flanged tubular shell supported on said base having a plurality of openings in the walls of said shell adapted to form access therein, a feed pan provided with orifices secured within said shell and resting upon said base, a container having an orifice in its truncated conical end adapted to be supported in inverted position by said shell, and a closure for said container, whereby grain or poisoned material contained in said container may be sealed when being transported.

2. A rodent exterminator, comprising a base member having a centrally disposed and transversely extending drain bore therethrough, a metallic container holder provided with openings in the sides thereof and rigidly secured to said base, a container detachably mounted on said holder, said container having an outlet for the exit of its contents to the base member, and means disposed over the bore in said base member to prevent the escape of grain through said bore but permitting the escape of rain water.

In witness that I claim the foregoing I have hereunto subscribed my name this 16 day of June, 1913.

CLYDE J. SILL.

Witnesses:
W. G. STEWART,
C. R. STEWART.

Copies of this patent may be obtained for five cents each, by addressing the "Commissioner of Patents, Washington, D. C."